United States Patent
Mayo

(10) Patent No.: US 9,889,926 B2
(45) Date of Patent: Feb. 13, 2018

(54) AIR VEHICLES AND SYSTEMS FOR PREEMPTIVE TURBULENCE MITIGATION

(71) Applicant: Gulfstream Aerospace Corporation, Savannah, GA (US)

(72) Inventor: John R. Mayo, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 143 days.

(21) Appl. No.: 14/948,689

(22) Filed: Nov. 23, 2015

(65) Prior Publication Data

US 2017/0144748 A1    May 25, 2017

(51) Int. Cl.
*G01C 23/00* (2006.01)
*B64C 13/16* (2006.01)
*B64C 13/50* (2006.01)

(52) U.S. Cl.
CPC ............ *B64C 13/16* (2013.01); *B64C 13/503* (2013.01)

(58) Field of Classification Search
CPC .............................. B64C 13/16; B64C 13/503
USPC .......... 701/3, 10; 244/3.16, 13, 76, 175, 182
See application file for complete search history.

(56) References Cited

U.S. PATENT DOCUMENTS

| | | | |
|---|---|---|---|
| 4,483,614 A | 11/1984 | Rogers | |
| 8,508,723 B2 | 8/2013 | Chang et al. | |
| 8,724,099 B2 | 5/2014 | Asahara et al. | |
| 8,774,987 B2 * | 7/2014 | Walton | B64C 13/16 244/76 C |
| 8,908,160 B2 | 12/2014 | Dakin et al. | |
| 8,930,049 B2 * | 1/2015 | Mamidipudi | B64C 19/00 356/28.5 |
| 9,097,799 B2 | 4/2015 | Inokuchi | |
| 9,070,284 B2 | 6/2015 | Inokuchi et al. | |
| 9,116,243 B1 * | 8/2015 | Brown | G01S 17/95 |
| 2005/0035242 A1 * | 2/2005 | Nugent | B64C 13/16 244/175 |
| 2005/0045761 A1 * | 3/2005 | Nugent | B64C 13/16 244/3.16 |
| 2008/0308682 A1 * | 12/2008 | Builta | B64D 31/08 244/182 |
| 2009/0048723 A1 * | 2/2009 | Nugent | B64C 13/16 701/10 |
| 2010/0171002 A1 * | 7/2010 | Hahn | G05D 1/0816 244/76 C |
| 2011/0299062 A1 * | 12/2011 | Jenaro Rabadan | G01S 17/95 356/28.5 |
| 2013/0166113 A1 * | 6/2013 | Dakin | G01N 21/53 701/10 |

(Continued)

*Primary Examiner* — Thomas G Black
*Assistant Examiner* — Luke Huynh
(74) *Attorney, Agent, or Firm* — LK Global|Lorenz & Kopf, LLP

(57) ABSTRACT

Air vehicles, fly-by wire systems, and method for preemptive mitigation of turbulence are provided. An air vehicle includes a flight control surface, a sensor, and a controller. The sensor is configured to determine a velocity of an air mass that is separated from the air vehicle by a predetermined distance. The controller is communicatively coupled with the sensor and is configured to determine whether the air mass will disturb smooth flight of the air vehicle. The controller is further configured to manipulate the flight control surface in response to determining that the air mass will disturb smooth flight of the air vehicle.

16 Claims, 3 Drawing Sheets

(56) References Cited

U.S. PATENT DOCUMENTS

2013/0250276 A1 9/2013 Chang et al.
2014/0379263 A1 12/2014 Ray et al.

* cited by examiner

US 9,889,926 B2

AIR VEHICLES AND SYSTEMS FOR PREEMPTIVE TURBULENCE MITIGATION

TECHNICAL FIELD

The technical field relates generally to air vehicles and systems for preemptive turbulence mitigation, and more particularly relates to air vehicles and systems that control flight surfaces based on a velocity of an air mass that is separated from the air vehicle.

BACKGROUND

Aircraft ride quality is important to aircraft passengers and flight crews. This ride quality generally deteriorates when the aircraft flies through atmospheric turbulence. Advanced flight control systems, e.g., Fly-by-wire, typically feature control laws that use pilot control commands and inertial and air data sensor data as inputs to control algorithms in the Flight Control Computer (FCC) to move flight control surfaces and thus improve flight path control and stability. The sensor feedback in these conventional systems, however, is entirely reactive. For example, these conventional aircraft must experience the deteriorated ride quality before any stability control becomes active. Accordingly, these conventional aircraft have limited ability to smooth the aircraft response in turbulence.

As such, it is desirable to provide a flight control system with improved ride quality. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of air vehicles, controllers, and methods for preemptive turbulence mitigation are disclosed herein.

In a first non-limiting embodiment, an air vehicle includes, but is not limited to, a flight control surface, a sensor, and a controller. The sensor is configured to determine a velocity of an air mass that is separated from the air vehicle by a predetermined distance. The controller is communicatively coupled with the sensor and is configured to determine whether the air mass will disturb smooth flight of the air vehicle. The controller is further configured to manipulate the flight control surface in response to determining that the air mass will disturb smooth flight of the air vehicle.

In a second non-limiting embodiment, a controller for an air vehicle includes, but is not limited to, a computer hardware component and a control logic component operationally coupled with the computer hardware component. The computer hardware component includes an input/output (I/O) portion configured for generating signals for receipt by a flight control surface actuator of the air vehicle. The computer hardware component and the control logic component cooperate to configure the controller to receive a signal indicating a velocity of an air mass that is separated from the air vehicle by a predetermined distance and determine whether the air mass will disturb smooth flight of the air vehicle. The controller is further configured to mitigate turbulence by manipulating the flight control surface prior to entry of the air vehicle into the air mass in response to determining that the air mass will disturb smooth flight of the air vehicle.

In a third non-limiting embodiment, a method for preemptive turbulence mitigation in an air vehicle, but is not limited to, measuring a velocity of an air mass that is separated from the air vehicle by a predetermined distance. The method further includes determining whether the air mass will disturb smooth flight of the air vehicle. The method further yet includes mitigating turbulence by manipulating the flight control surface prior to entry of the air vehicle into the air mass in response to determining that the air mass will disturb smooth flight of the air vehicle.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

Figure 1:
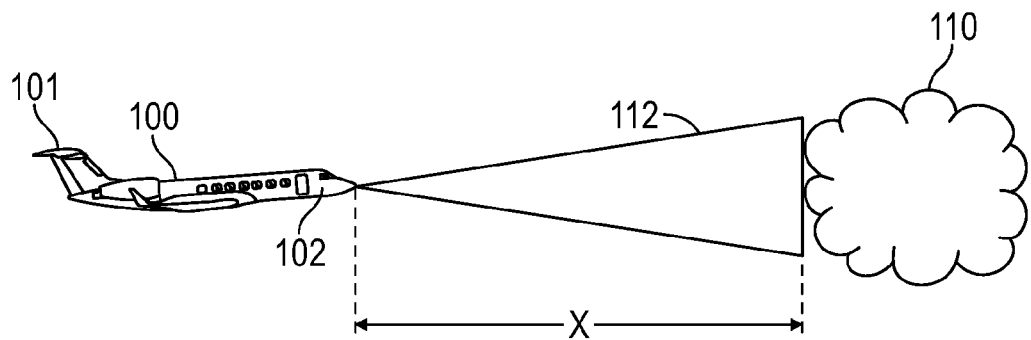
FIG. 1 is a simplified block diagram of an airplane approaching a turbulent air mass in accordance with teachings of the present disclosure.

Referring now to FIG. 1, an example of an airplane 100 with flight control surfaces 101 and an advanced flight control system 102 is illustrated in accordance with some embodiments. Although airplane 100 is described in this description, it should be appreciated that the disclosure may be utilized for other air vehicles or other machinery without departing from the scope of the present disclosure. For example, advanced flight control system 102 may be utilized in submarines, helicopters, airships, or spacecraft. Flight control surfaces 101 may include elevators, stabilizers, ailerons, spoilers, rudders, and other adjustable surfaces that steer or guide airplane 100 during flight.

In the example provided, airplane 100 is flying towards an air mass ($M_{AIR}$) 110. Advanced flight control system 102 is configured to measure a velocity of air mass 110 a distance X away from airplane 100. Distance X may be any distance greater than a boundary layer of air flowing over airplane 100. As will be appreciated by those with ordinary skill in the art, the air outside of the boundary layer is substantially undisturbed by airplane 100. Accordingly, air mass 110 represents potential turbulence, winds aloft, or other air conditions that may impact a ride quality of airplane 100.

In the example provided, distance X is approximately 300 meters and advanced flight control system 102 measures air mass 110 in a cone 112 in front of airplane 100. It should be appreciated that other distances X, other measurement area shapes, and other directions from airplane 100 may be utilized without departing from the scope of the present disclosure.

Figure 2:
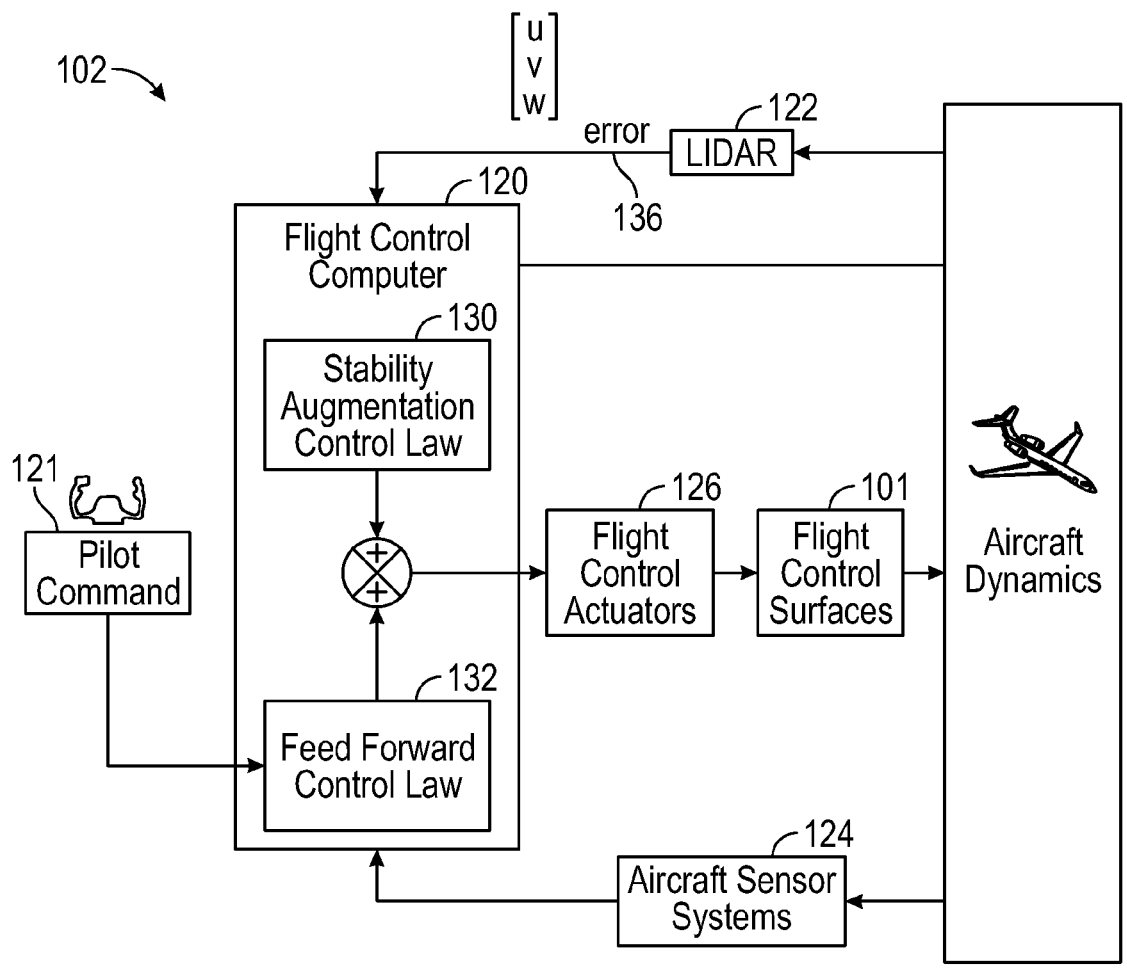
FIG. 2 is a simplified block diagram of an advanced flight control system of the airplane of FIG. 1 in accordance with teachings of the present disclosure.

Referring now to FIG. 2, an example of fly-by-wire system 102 is illustrated in accordance with some embodiments. As used herein, the term "fly-by-wire" encompasses all systems in which an input device is mechanically operationally disconnected from a machine or portions of a machine that are controlled by the input device, such as flight control surfaces 101. For example, fly-by-wire as used herein encompasses terms used for the specific technology used to communicate commands between the input device and an electronic controller, such as fly-by-light or fly-by wireless. In alternative embodiments, fly-by-wire system 102 may be replaced with a mechanically linked flight system that includes motors and other controls to manipulate flight command input devices, as will be appreciated by those with ordinary skill in the art.

In the example provided, fly-by-wire system 102 includes a controller 120, a pilot command input device 121, an air mass sensor 122, air data and inertial sensors 124, and flight control actuators 126. Controller 120 may include any control circuitry capable of performing the various tasks described below with reference to FIG. 5. For example, controller 120 may include an application specific integrated circuit (ASIC), an electronic circuit, a processor (shared, dedicated, or group) and memory that execute one or more software or firmware programs, a combinational logic circuit, and/or other suitable components that provide the described functionality. In some embodiments, the network devices may include hardware-based logic, or may include a combination of hardware, firmware, and/or software elements. In the example provided, controller 120 includes a computer hardware component and a control logic component operationally coupled with the computer hardware component. The computer hardware component includes an input/output (I/O) portion configured for generating signals for receipt by flight control actuators 126 to manipulate flight control surfaces 101 of airplane 100. In the example provided, the control logic component is software or firmware programmed to perform the algorithm described below with reference to FIG. 5. The computer hardware component and the control logic component cooperate to configure controller 120 to perform various operations illustrated in FIG. 5, as will be described below.

Air mass sensor 122 may be any sensor capable of detecting the velocity of air mass 110. For example, air mass sensor 122 may be a Doppler Light Detection and Ranging (LIDAR) system that utilizes Laser Doppler Velocimetry (LDV) to directly measure the velocity of particles suspended in air mass 110. In the example provided, air mass sensor 122 is a WINDSCEPTOR™ (registered trademark of Optical Air Data Systems, LLC of Manassas, Va.) model sensor suite commercially available from OPTICAL AIR DATA SYSTEMS of Manassas, Va. It should be appreciated that other technologies capable of measuring the velocity of air mass 110 may be utilized without departing from the scope of the present disclosure. Those of ordinary skill in the art will appreciate that air mass sensor 122 differs from conventional air data systems (pitot tubes, etc.) by measuring air that is separated from the air vehicle and that is located outside of the boundary layer extending from the air vehicle.

Air data and inertial sensors 124 include sensors conventionally used to measure a velocity of airplane 100, an angular rate of airplane 100, an acceleration of an airplane 100, an attitude of airplane 100, a heading of airplane 100, and other conventional air data and inertial parameters used in air navigation and stability augmentation. For example, aircraft sensors 124 may include pitot tubes, gyros, accelerometers, and the like. Flight control actuators 126 are coupled with flight control surfaces 101 to manipulate flight control surfaces 101 in response to commands from controller 120.

Fly-by-wire system 102 is configured to control flight control surfaces 101 of airplane 100 based on the velocity of air mass 110, on a stability augmentation control law 130, and on a feed forward control law 132. Pilot commands from pilot command input device 121 are input to feed forward control law 132 and are combined with output from stability augmentation control law 130 to generate the commands sent to flight control actuators 126. Stability augmentation control law 130 and feed forward control law 132 differ from conventional control laws by utilizing an error signal 136 calculated from the velocity of air mass 110, as will be described below.

Figure 3:
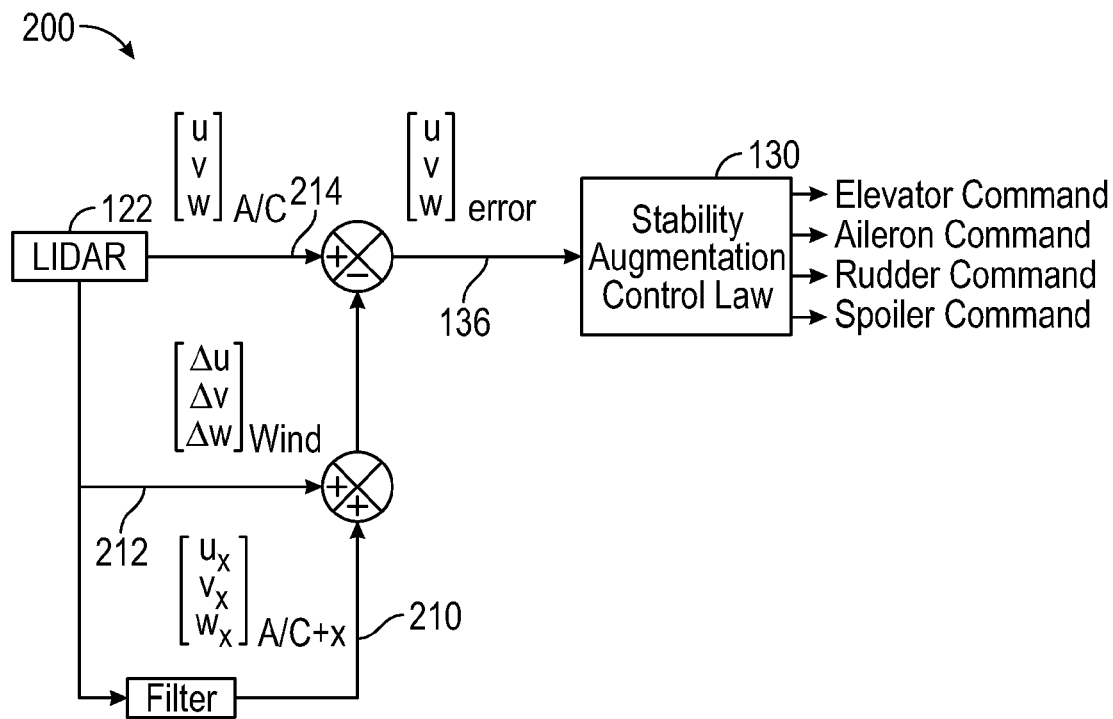
FIGS. 3-4 are simplified block diagrams of control logic implemented in the advanced flight control system of FIG. 2 in accordance with teachings of the present disclosure.

FIG. 3 illustrates a simplified block diagram of control logic 200 that calculates error signal 136. In the example provided, control logic 200 is implemented in controller 120. Error signal 136 indicates a difference between a current velocity 214 of airplane 100 and a sum of the velocity 212 of air mass 110 and a predicted velocity 210 of airplane 100 upon reaching air mass 110. For example, when airplane 100 is turning or accelerating, predicted velocity 210 may be different from current velocity 214. Accordingly, large differences between velocity 212 of air mass 110 and expected velocity 210 result in a large error signal 136 and a larger mitigation response at flight control surfaces 101.

Figure 4:
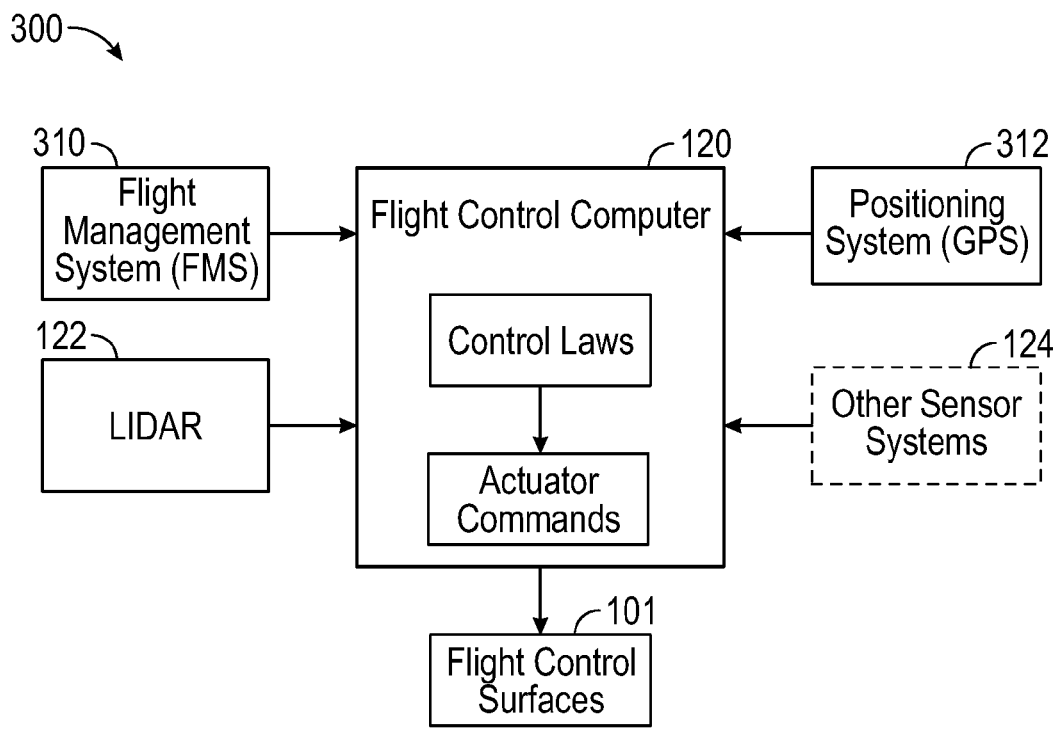

FIG. 4 illustrates a simplified block diagram of control logic 300 that guides airplane 100 away from air mass 110 in response to determining that air mass 110 will disrupt smooth flight of airplane 100. Controller 120 receives input from air mass sensor 122, air data sensors 124, a flight management system 310, and a positioning system 312. Flight management system 310 includes flight clearance and flight progress guidance information for the current flight. Positioning system 312 determines a position of airplane 100. In the example provided, positioning system 312 is a global positioning system (GPS) system.

Controller 120 is configured to determine whether air mass 110 will disturb smooth flight. Controller 120 is further configured to attempt to guide airplane 100 to avoid air mass 110 in response to determining that air mass 110 will disturb smooth flight. For example, controller 120 generates commands to manipulate flight control surfaces 101 to alter a heading or altitude of airplane 100 within position limits defined in flight management system 310.

Figure 5:
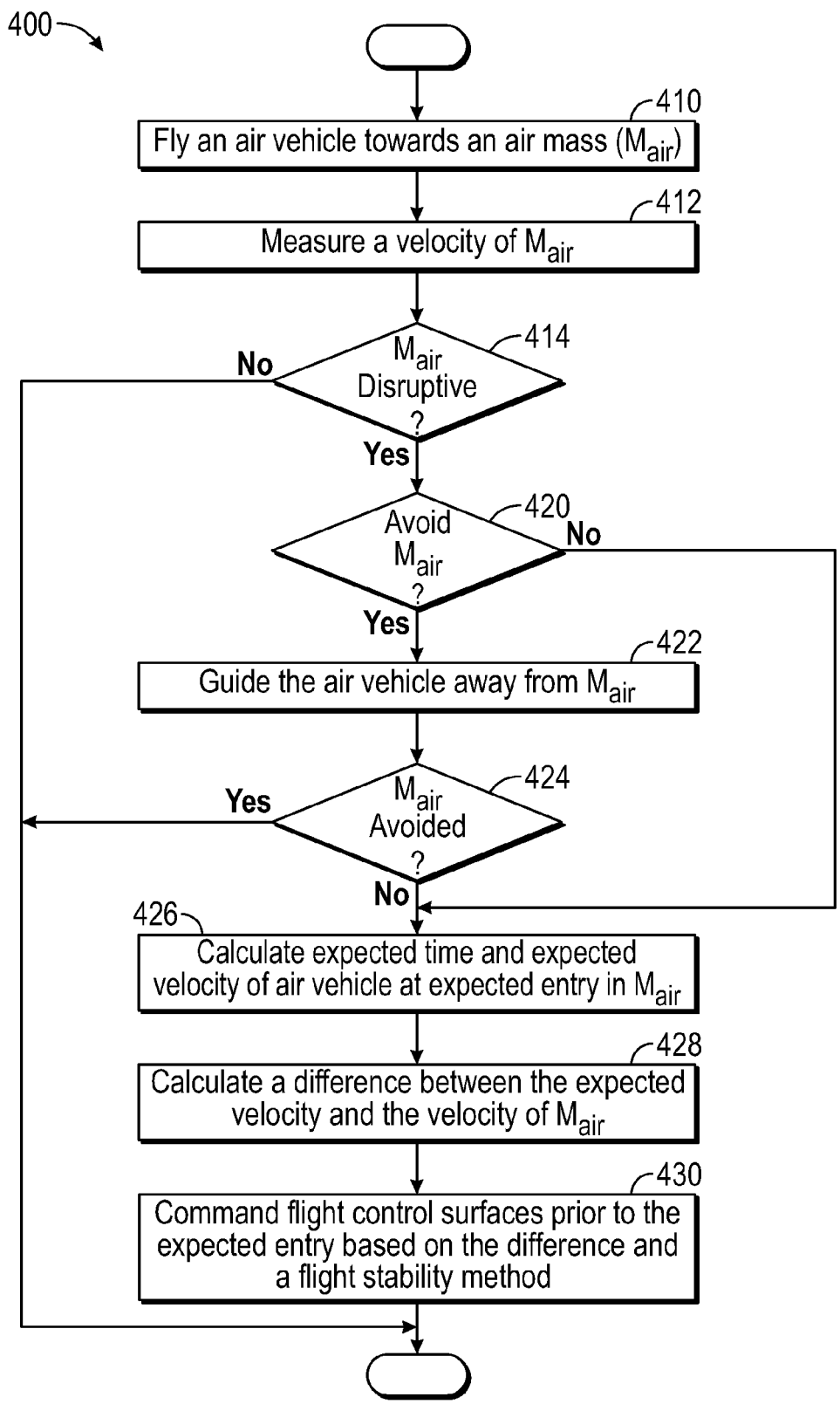
FIG. 5 is a simplified flow diagram of operations of a method in accordance with teachings of the present disclosure.

FIG. 5 illustrates a simplified flow diagram of a method 400 for preemptive mitigation of turbulence in an air vehicle. In the example provided, controller 120 is configured to perform the operations of method 400. It should be appreciated that other systems on other air vehicles may be configured to perform the operations without departing from the scope of the present disclosure.

The controller flies an air vehicle towards an air mass in operation 410. For example, controller 120 may fly airplane 100 towards air mass 110 based on a flight plan from a flight management system. A sensor measures a velocity of an air mass separated from the air vehicle in operation 412. For example, air mass sensor 122 may measure air mass 110 at distance X in front of airplane 100. In the example provided, air mass sensor 122 further generates a signal indicating the velocity of air mass 110 for controller 120.

Controller 120 determines whether air mass 110 will disrupt smooth flight of the airplane 100 in operation 414. For example, controller 120 may determine that air mass 110 will disrupt smooth flight when the velocity of air mass 110 is different from a velocity of airplane 100 by more than a predetermined amount. When air mass 110 will not disrupt smooth flight, no preemptive action will be taken. When air mass will disrupt smooth flight, controller 120 determines whether to attempt avoidance of air mass 110. For example, controller 120 may utilize control logic 300 to avoid air mass 110 within customizable deviation limits defined in flight management system 310. In some embodiments, the flight crew of airplane 100 may turn the avoidance feature on or off in controller 120. In some embodiments, the avoidance feature is omitted.

When controller 120 determines it will not attempt to avoid air mass 110 in operation 420, method 400 proceeds to operation 426. Conversely, when controller 120 determines it will attempt to avoid air mass 110 in operation 420, controller 120 guides airplane 100 away from air mass 110 in operation 422. For example, controller 120 may manipulate flight control surfaces 101 to change the altitude or heading of airplane 100 within customizable or flight clearance dictated deviation limits. In some embodiments, controller 120 determines a trajectory by which an intrusion of airplane 100 into air mass 110 is reduced or avoided and manipulates flight control surfaces 101 to achieve the trajectory.

Controller 120 determines whether airplane 100 avoided air mass 110 in operation 424. When airplane 100 avoided air mass 110, no further mitigation is needed. When airplane 100 did not completely avoid air mass 110, method 400 proceeds to operation 426.

Controller 120 calculates an expected time and an expected velocity of airplane 100 at an expected entry of airplane 100 into air mass 110. For example, when airplane 100 is accelerating or turning, the expected velocity at the expected entry will not be the same as a current velocity.

Controller 120 calculates a difference between the expected velocity of airplane 100 and the velocity of air mass 110 in operation 428. For example, controller 120 may utilize control logic 200 to calculate error signal 136. Controller 120 commands flight control surfaces 101 prior to the expected entry in operation 430. The commands are based on the difference calculated in operation 428 and on stability augmentation control law 130 in combination with feed forward control law 132. The commands manipulate flight control surfaces 101 to counteract and mitigate the expected turbulence from air mass 110. For example, controller 120 may turn or roll airplane 100 into a crosswind in operation 430. In other examples, controller 120 may command a pitch control elevator to pitch up to counteract a nose down condition expected to result from flying through air mass 110.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An air vehicle comprising:
a flight control surface;
a sensor configured to determine a velocity of an air mass that is separated from the air vehicle by a predetermined distance; and
a controller communicatively coupled with the sensor and configured to:
determine whether the air mass will disturb smooth flight of the air vehicle; and
manipulate the flight control surface in response to determining that the air mass will disturb smooth flight of the air vehicle based on the velocity of the air mass,
wherein the controller is further configured to manipulate the flight control surface using a control algorithm.

2. The air vehicle of claim 1, wherein the predetermined distance is greater than a thickness of a boundary layer of air flowing over the air vehicle in a direction of the air mass.

3. The air vehicle of claim 1, wherein the sensor is a Light Detection and Ranging (LIDAR) system.

4. The air vehicle of claim 1, wherein the controller is further configured to:
calculate an expected entry of the air vehicle into the air mass; and
manipulate the flight control surface prior to the expected entry of the air vehicle into the air mass.

5. The air vehicle of claim 1, wherein the controller is further configured to calculate an error signal and to manipulate the flight control surface based on the error signal, wherein the error signal indicates a difference between a current velocity of the air vehicle and a sum of the velocity of the air mass and a predicted velocity of the air vehicle upon reaching the air mass.

6. The air vehicle of claim 1, wherein the controller is further configured to determine a trajectory by which an intrusion of the air vehicle into the air mass is reduced, and wherein the controller is further configured to manipulate the flight control surface to achieve the trajectory.

7. The air vehicle of claim 6, wherein the controller is further configured to determine the trajectory by which the intrusion of the air vehicle into the air mass is substantially avoided.

8. A controller for an air vehicle, the controller comprising:
a computer hardware component including an input/output (I/O) portion configured for generating signals for receipt by a flight control surface actuator of the air vehicle; and
a control logic component operationally coupled with the computer hardware component,
wherein the computer hardware component and the control logic component cooperate to configure the controller to:
receive a signal indicating a velocity of an air mass that is separated from the air vehicle by a predetermined distance, wherein the predetermined distance is greater than a thickness of a boundary layer of air flowing over the air vehicle in a direction of the air mass; and determine whether the air mass will disturb smooth flight of the air vehicle; and mitigate turbulence by manipulating the flight control surface prior to and during entry of the air vehicle into the air mass in response to determining that the air mass will disturb smooth flight of the air vehicle.

9. The controller of claim 8, wherein the controller is configured to receive the signal from a Light Detection and Ranging (LIDAR) system.

10. The controller of claim 8, wherein the controller is further configured to:

calculate an expected entry of the air vehicle into the air mass; and manipulate the flight control surface prior to the expected entry of the air vehicle into the air mass.

11. The controller of claim 8, wherein the controller is further configured to manipulate the flight control surface based on the velocity of the air mass.

12. The controller of claim 11, wherein the controller is further configured to manipulate the flight control surface using a stability augmentation control algorithm.

13. The controller of claim 8, wherein the controller is further configured to calculate an error signal and to manipulate the flight control surface based on the error signal, wherein the error signal indicates a difference between a current velocity of the air vehicle and a sum of the velocity of the air mass and a predicted velocity of the air vehicle upon reaching the air mass.

14. The controller of claim 8, wherein the controller is further configured to determine a trajectory by which an intrusion of the air vehicle into the air mass is reduced, and wherein the controller is further configured to manipulate the flight control surface to achieve the trajectory.

15. The controller of claim 14, wherein the controller is further configured to determine the trajectory by which the intrusion of the air vehicle into the air mass is substantially avoided.

16. A method for preemptive turbulence mitigation in an air vehicle, the method comprising:

measuring a velocity of an air mass that is separated from the air vehicle by a predetermined distance;

determining whether the air mass will disturb smooth flight of the air vehicle;

mitigating turbulence by manipulating the flight control surface prior to and during entry of the air vehicle into the air mass in response to determining that the air mass will disturb smooth flight of the air vehicle, and calculating an error signal and manipulating the flight control surface based on the error signal, wherein the error signal indicates a difference between a current velocity of the air vehicle and a sum of the velocity of the air mass and a predicted velocity of the air vehicle upon reaching the air mass.

* * * * *